(12) United States Patent
Seitz et al.

(10) Patent No.: US 7,316,075 B2
(45) Date of Patent: Jan. 8, 2008

(54) COORDINATE MEASURING MACHINE FOR METROLOGICAL DETERMINATION OF A COORDINATE ON A TEST OBJECT

(75) Inventors: Karl Seitz, Oberkochen (DE); Wolfgang Strauss, Staig (DE); Roland Roth, Waldstetten (DE); Walter Dominicus, Königsbronn (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 0 days.

(21) Appl. No.: 11/581,686

(22) Filed: Oct. 16, 2006

(65) Prior Publication Data

US 2007/0089313 A1 Apr. 26, 2007

Related U.S. Application Data

(63) Continuation of application No. PCT/EP2005/003133, filed on Mar. 24, 2005.

(30) Foreign Application Priority Data

Apr. 19, 2004 (DE) ...................... 10 2004 020 996

(51) Int. Cl.
*G01B 5/008* (2006.01)
(52) U.S. Cl. ....................................................... 33/503
(58) Field of Classification Search ................. 33/503, 33/1 M
See application file for complete search history.

(56) References Cited

U.S. PATENT DOCUMENTS

| 3,345,747 | A | * | 10/1967 | Sattler .......................... 33/1 M |
| 4,630,374 | A | | 12/1986 | Raleigh ......................... 33/1 M |
| 4,651,439 | A | | 3/1987 | Band et al. .................... 33/559 |
| 4,845,855 | A | | 7/1989 | Meyer |
| 4,995,277 | A | * | 2/1991 | Yanagisawa .............. 74/490.09 |
| 5,257,461 | A | | 11/1993 | Raleigh et al. ................ 33/503 |
| 5,867,916 | A | * | 2/1999 | Matzkovits ................... 33/503 |
| 5,886,494 | A | * | 3/1999 | Prentice et al. .............. 318/625 |
| 6,038,779 | A | * | 3/2000 | Lee et al. ....................... 33/503 |
| 6,327,929 | B1 | * | 12/2001 | Yanagisawa .............. 74/490.09 |
| RE37,695 | E | * | 5/2002 | Leitenberger et al. ........ 33/503 |
| 6,820,344 | B2 | * | 11/2004 | Haage et al. .................. 33/436 |
| 6,857,195 | B2 | * | 2/2005 | Ruijl ............................ 33/503 |
| 2004/0177520 | A1 | * | 9/2004 | Nakamura et al. ........... 33/1 M |

FOREIGN PATENT DOCUMENTS

DE 101 24 493 A1 11/2001

OTHER PUBLICATIONS

Marc Vermeulec; "High-Precision 3D-Coordinate Measuring Machine, Design and Protoype Development"; 1999; 329 pages.

* cited by examiner

*Primary Examiner*—Christopher W Fulton
(74) *Attorney, Agent, or Firm*—Harness, Dickey & Pierce, P.L.C.

(57) ABSTRACT

A coordinate measuring machine for the metrological determination of a measurement coordinate on a test object comprises a table for mounting the test object. A first and a second bearing support are arranged on the table. A first and a second carriage, each moveable in a longitudinal direction, are mounted on the bearing supports. According to one aspect of the invention, the carriages are each mounted on the bearing supports via at least three, preferably four separate bearing points, with the bearing points defining a plane that is perpendicular to the plane of the table.

19 Claims, 5 Drawing Sheets

COORDINATE MEASURING MACHINE FOR METROLOGICAL DETERMINATION OF A COORDINATE ON A TEST OBJECT

CROSS REFERENCES TO RELATED APPLICATIONS

This application is a continuation of international patent application PCT/EP2005/003133 filed on Mar. 24, 2005 designating the U.S., which international application has been published in German language as WO 2005/100906 A1 and claims priority of German patent application DE 10 2004 020 996.0 filed on Apr. 19, 2004. The entire contents of these priority applications are incorporated herein by reference.

BACKGROUND OF THE INVENTION

The present invention relates to a coordinate measuring machine for determining 2D or 3D coordinates of a test object. More particularly, the invention relates to coordinate measuring machines designed for providing extremely high 2D or 3D measurement accuracies.

Coordinate measuring machines of this type might be used for determining the object form of a test object with high accuracy. For example, they might be used for checking the object form of machine-produced workpieces for quality control. Typically, a touch probe having a movably mounted stylus is used as a measuring probe, and this touch probe is moved, by means of a suitable traversing mechanism of the coordinate measuring machine, up to the test object until the touch probe stylus touches a desired measurement point on the test object. The spatial coordinate of the sensed measurement point can then be determined from the position of the touch probe and the displacement of the stylus relative to the touch probe. The invention is not, however, restricted to coordinate measuring machines with tactile touch probes, and can also be used in coordinate measuring machines with different measuring probes, such as optical probes.

Various concepts are known for the traversing mechanisms. In the case of machines for three-dimensional measurement (3D coordinate measuring machines), typical concepts are the portal design, horizontal-arm coordinate measuring machines and coordinate measuring machines having a column design. Coordinate measuring machines of portal design comprise a portal moveable in the X-direction and having a cross beam on which a carriage moveable in the Y-direction is arranged. The Y-carriage carries a quill, which is moveable in the Z-direction. Such a coordinate measuring machine is known for example from DE 101 24 493 A1.

Horizontal-arm coordinate measuring machines have a pillar that is moveable in the X-direction, on which a carriage moveable in the Z-direction is arranged. The Z-carriage carries an arm that is adjustable in the Y-direction, the free end of the arm carries the touch probe.

Coordinate measuring machines of column design have a column, which carries the quill that is moveable in the Z-direction. The column itself can be moved in the X- and/or Y-direction. Alternatively, the X- and Y-guide axes can also be provided by a correspondingly moveable table for mounting the test object.

The known concepts each have design-related advantages and disadvantages, in particular with respect to the accessibility of the measurement volume and susceptibility to static and dynamic deformations and the resultant measurement errors. As will easily be understood, there is for example deformation of the cantilever horizontal arm in a horizontal-arm coordinate measuring machine in relation to the Y-position of the touch probe, under the effect of gravity.

Another kind of a coordinate measuring machine traversing mechanism is disclosed by the thesis "High-Precision 3D-Coordinate Measuring Machine" by Marc Vermeulen, which is deposited at the Eindhoven Technical University and is available under ISBN number 90-386-2631-2. The thesis can also be found on the Internet at the address http://alexandria.tue.nl/extra2/9902695.pdf.

In the aforementioned thesis, a coordinate measuring machine having a novel traversing mechanism is proposed, which makes it possible to eliminate at least some sources of errors due to static and dynamic deformations, so that the measurement accuracy can be increased. Basically the proposed coordinate measuring machine has two bearing supports arranged in a V-shape relative to each other and acting as linear guideways for the X- and Y-direction. Each bearing support carries a carriage that can be displaced longitudinally, and a beam that can be displaced perpendicularly to the bearing support is arranged on each carriage. The two beams are once again arranged in a V-shape relative to one another, with the first beam extending substantially parallel to the second bearing support and vice versa. The free ends of the beams, facing one another, are connected to a platform, which is thus moveable in the X- and Y-direction and carries a quill that is moveable in the Z-direction. Practical tests with the proposed coordinate measuring machine have shown that a traversing mechanism of this type allows to achieve far higher measurement accuracy than with the designs known hitherto.

Although the modified design of the traversing mechanism already eliminates some sources of errors, or reduces their effects, it is still desirable to achieve even greater measurement accuracy.

SUMMARY OF THE INVENTION

Therefore, it is an object of the present invention to provide a coordinate measuring machine of the kind described above, but with an improved design of the traversing mechanism so that even higher measurement accuracies can be achieved.

According to one aspect of the invention, there is provided a coordinate measuring machine for the metrological determination of a measurement coordinate on a test object, comprising a table for mounting the test object, the table defining a first plane, a probe holder for receiving a measuring probe, a first bearing support, on which a first carriage is mounted moveably in a first longitudinal direction, a second bearing support, on which a second carriage is mounted moveably in a second longitudinal direction, and a first and a second beam, each of which being coupled to the probe holder, wherein the first beam extends parallel to the second bearing support and is arranged on the first carriage such that it can be moved longitudinally in the second direction, and wherein the second beam extends parallel to the first bearing support and is arranged on the second carriage such that it can be moved longitudinally in the first direction, wherein each carriage is mounted on the respective bearing support via at least three vertical bearing points, which define a vertical bearing plane perpendicular to the first plane.

According to another aspect, there is provided a coordinate measuring machine for the metrological determination of a measurement coordinate on a test object, comprising a table for mounting the test object, the table having a topside and an underside, a probe holder for receiving a measuring probe, a platform on which the probe holder is arranged, a first bearing support, on which a first carriage is mounted moveably in a first longitudinal direction, a second bearing support, on which a second carriage is mounted moveably in a second longitudinal direction, and a first and a second beam, each of which being coupled to platform, wherein the first beam extends parallel to the second bearing support and is arranged on the first carriage such that it can be moved longitudinally in the second direction, wherein the second beam extends parallel to the first bearing support and is arranged on the second carriage such that it can be moved longitudinally in the first direction, wherein the platform is supported on the table via at least three platform bearings which bear against the topside and via at least three platform counter bearings which bear against the underside and cooperate with the platform bearings on the topside.

The carriages in the known coordinate measuring machines are always mounted on the bearing supports via just two bearing points, with the two bearing points lying on a straight line parallel to the respective direction of movement of the carriage. The provision of a third and preferably a fourth bearing point, which define a plane perpendicular to the plane of the table, gives a relative increase in stability and therefore in the accuracy of guidance. Practical tests have shown that the measurement accuracy can be increased even further in this way, because the probe holder can be positioned even more precisely in the measurement volume. In particular, the repeat accuracy in repeated approach of one and the same measurement point is increased by the modified bearing concept.

In addition, the known coordinate measuring machine has only one central counter bearing provided on the underside of the table. The design preferred here permits a more precise guidance and therefore greater measurement accuracy. Moreover, this design can be produced with less weight and smaller space requirements, which permits a higher speed of measurement without disadvantages in terms of measurement accuracy.

In a preferred refinement, each bearing support has a slot-shaped opening, through which one of the beams projects, wherein the bearing points lie outside of a plane defined by the slot-shaped opening.

This design makes it possible to guide the beams "inside" the bearing supports, as is already known per se from the coordinate measuring machine described above. By moving the bearing points outside of the plane defined by the slot-shaped openings, however, it is possible to achieve a larger amount of travel and in consequence a larger measurement volume, without any perceptible impairment of the attainable measurement accuracy. Therefore even higher relative accuracy can be achieved relative to the measurement volume.

In a further refinement, at least one bearing point lies on either side of the plane defined by the slot-shaped opening.

This design means that there is at least one bearing point both above and below each beam, guiding the carriage on the bearing support. This gives even better accuracy of positioning, and especially when the corresponding beam travels a large distance in its traversing direction. In this design the attainable measurement accuracy is even higher, and in fact even with an increased measurement volume relative to the arrangement known hitherto.

In a further refinement, each bearing support has an upper guide surface, on which the carriage is vertically supported via at least one bearing point, and preferably via at least two separate bearing points.

This design makes it possible to arrange the carriages so that they are "floating" on the bearing supports, i.e. without further support on the table. In that case the carriages are decoupled from the table. In contrast, the carriages in the known coordinate measuring machine are supported both on the bearing supports and on the table. This preferred embodiment gives at least equally high accuracy of guidance and measurement at a lower production cost.

In a further refinement, the probe holder is arranged on a platform, which is connected to the first and second beams and is supported on the table via at least one, preferably three platform bearings, wherein for each platform bearing there is a counter bearing which bears against the underside of the table. It is especially preferred if each platform bearing and its respective counter bearing are arranged on the same axis extending perpendicular to the table.

This preferred design permits even more precise guidance and therefore even greater measurement accuracy. Moreover, this design can be produced with less weight and smaller space requirements, which permits a higher speed of measurement without disadvantages in terms of measurement accuracy.

In a further refinement, the table has recesses under the bearing supports, and each platform bearing is connected to a platform counter bearing by a frame passing through the recesses.

The design preferred here is less heavy and less spacious, and therefore permits higher measurement speeds with at least equal measurement accuracy.

In a further embodiment the platform counter bearings are connected together by cross ties.

This design leads, with little additional weight, to even further improved accuracy of guidance and hence to even higher measurement accuracy.

In a further embodiment, the new coordinate measuring machine comprises a quill having a drive for longitudinal displacement in a third direction and having a measuring system for determining a longitudinal position of the quill in the third direction, and further comprising a plurality of quill bearings, which define the position of the quill perpendicularly to the third direction, wherein the drive and the measuring system are arranged in the same quadrant of an imaginary coordinate system having its origin at the center of gravity of the quill and having its axes extending parallel to planes that are defined by the quill bearings.

Whereas the refinements described up to now primarily affect the guidance accuracy in the first two directions of movement, this refinement mainly increases the guidance accuracy in the third coordinate direction. The arrangement of the drive and of the measuring system in the same quadrant of the imaginary coordinate system means that the measuring system can determine the position of the quill more precisely and with better tolerance with respect to static and dynamic effects.

It goes without saying that the features described so far and those yet to be explained below can be used not only in the respective stated combination, but also in other combinations or on their own, without departing from the scope of the present invention.

BRIEF DESCRIPTION OF THE DRAWING

Embodiments of the invention are shown in the drawings and are explained in more detail in the description given below. In the drawings.

DESCRIPTION OF PREFERRED EMBODIMENTS

In the drawings, an embodiment of the new coordinate measuring machine is designated by reference number 10 in its entirety. The coordinate measuring machine 10 has a table 12, which is preferably made of granite. On the upper side of table 12, two bearing supports 16 and 18 are arranged in a V-shape relative to one another, and in fact at right angles to one another in the preferred embodiment. The latter is not, however, absolutely necessary for carrying out the present invention. A carriage 20, 22 is mounted on each of the bearing supports 16, 18, as can be seen most clearly in FIGS. 3 and 4. Carriage 20 can be moved longitudinally in the direction of arrow 24, and carriage 22 can be moved longitudinally in the direction of arrow 26. The directions 24, 26 are the X- and Y-direction for the coordinate measuring machine 10.

Figure 1:
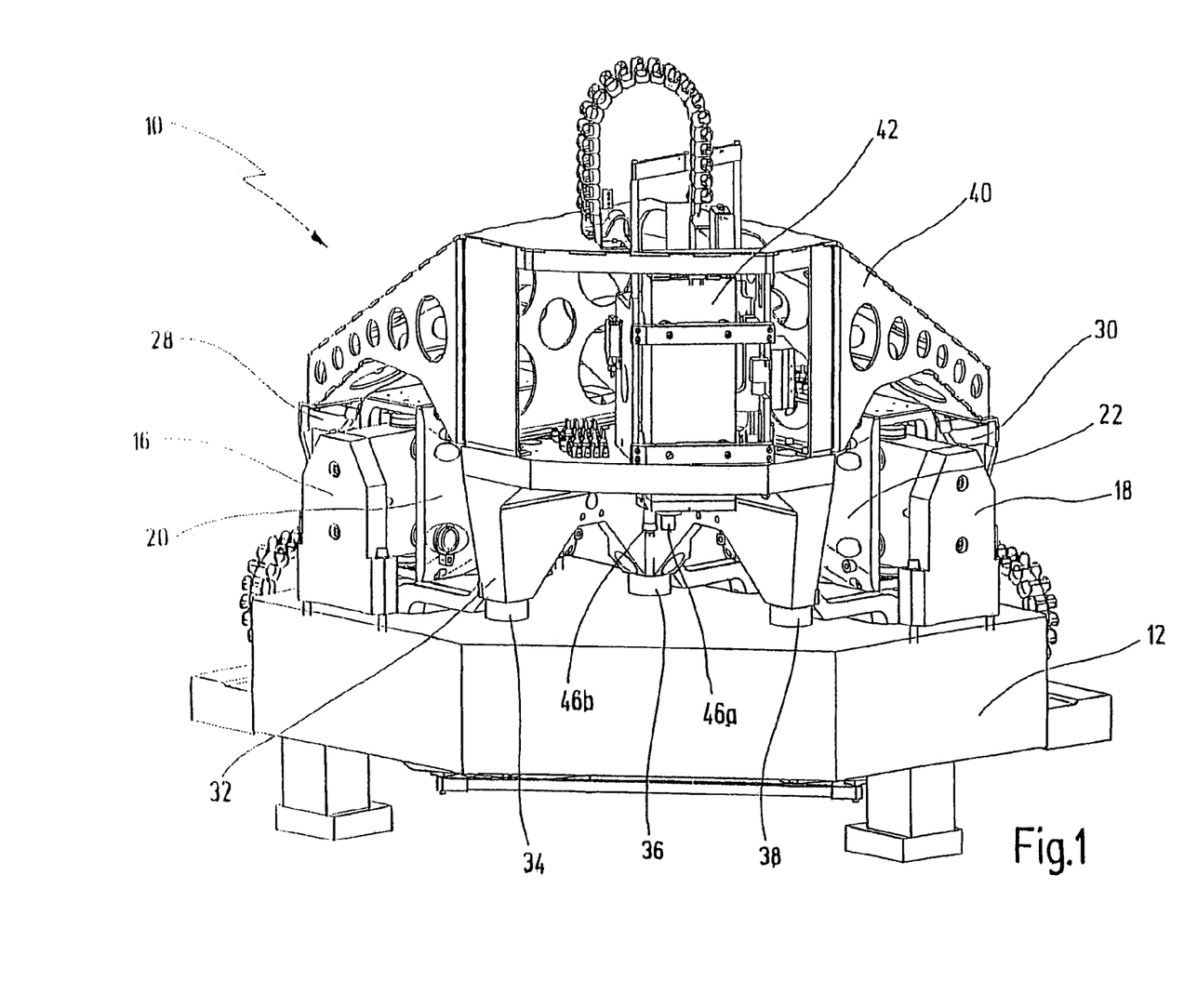
FIG. 1 is a perspective top view of the new coordinate measuring machine.
Figure 2:
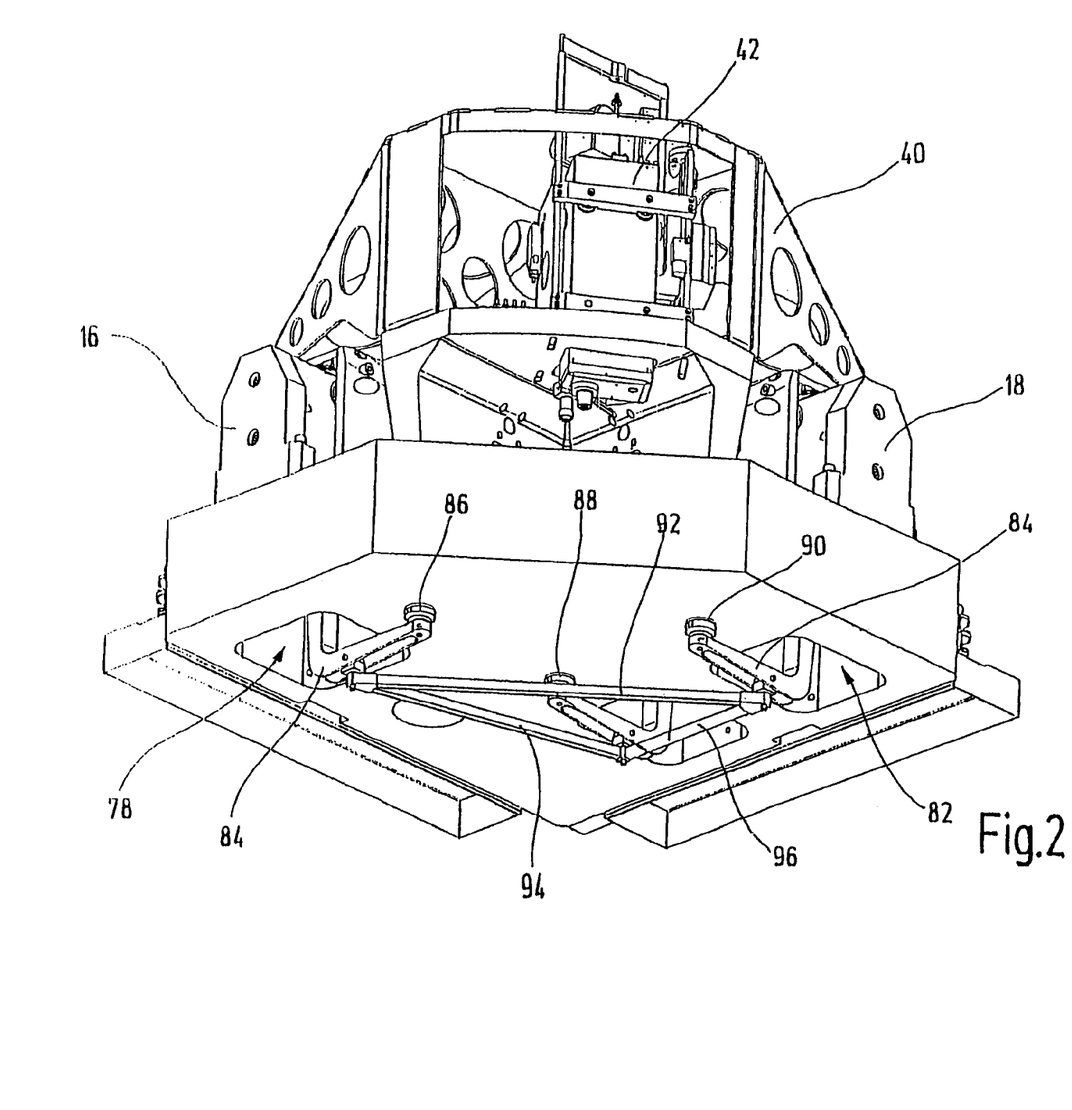
FIG. 2 shows the coordinate measuring machine from FIG. 1 in an oblique view from below, without showing the supporting feet of the table for sake of clarity.
Figure 3:
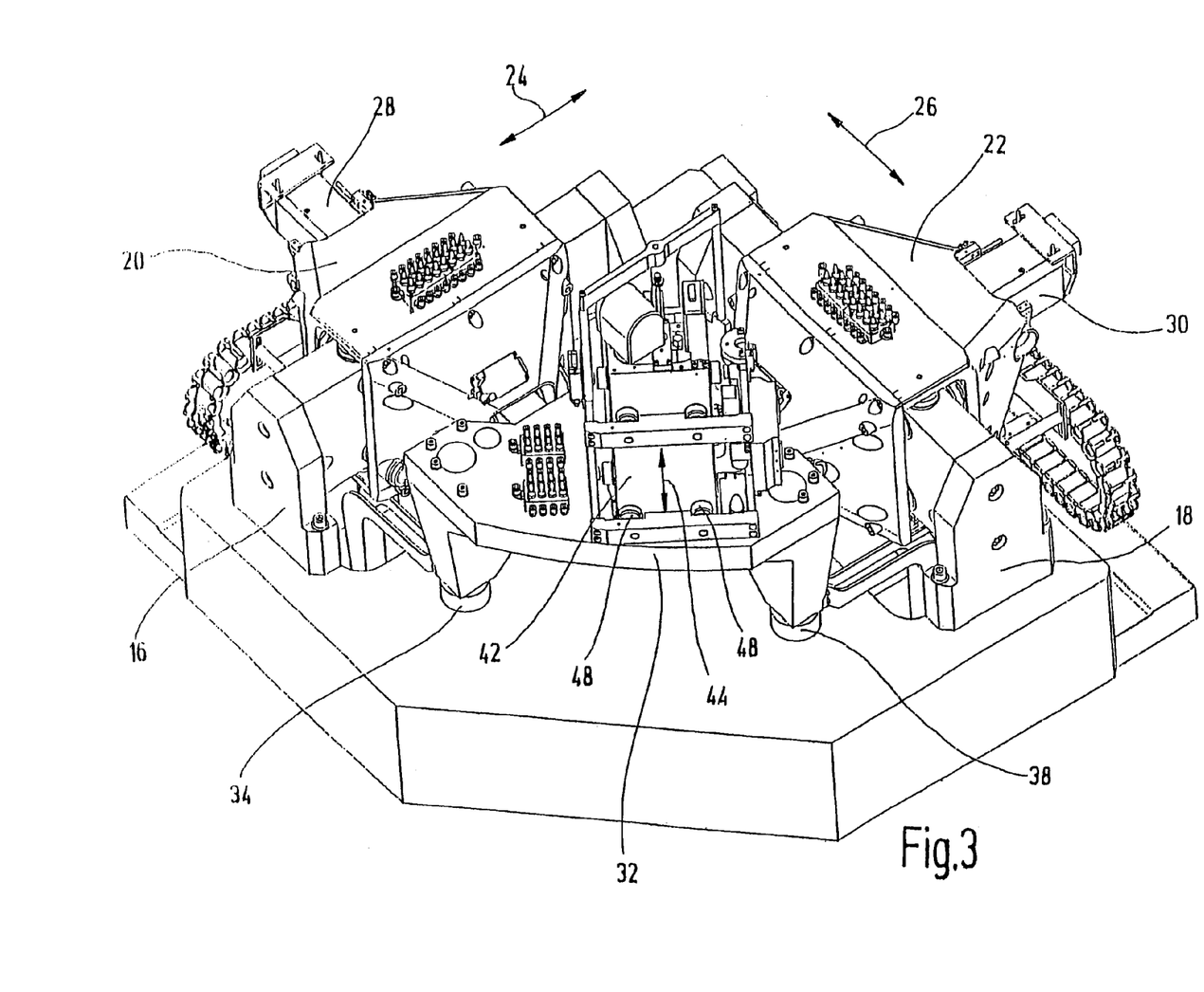
FIG. 3 shows the coordinate measuring machine from FIG. 1 in an oblique view from above, with certain parts not being shown for reasons of greater clarity.

Each carriage 20, 22 carries a beam 28, 30, as can be seen best in FIG. 3. Beam 28 extends parallel to bearing support 18 and can be moved longitudinally in the direction of arrow 26. Beam 30 extends parallel to bearing support 16 and can be moved in the direction of arrow 24. Therefore, the two beams 28, 30 are also arranged in a V-shape relative to one another, the two V-shaped structures of bearing supports 16, 18 and beams 28, 30 having their free ends facing one another or "plugged" into one another.

The free ends of beams 28, 30 facing each other are connected to a platform 32, which in turn is supported on the upper side of table 12 via bearings 34, 36, 38. Since carriages 20, 22 and beams 28, 30 can be moved longitudinally, platform 32 is moveable on table 12 in directions 24, 26.

On its upper side, platform 32 has a roof-shaped hood 40, which is above the bearing supports 16, 18 and carriages 20, 22 and is supported on the outer free ends of beams 28, 30. Hood 40 is made of aluminum plates, which have numerous holes, so as to reduce the weight of hood 40. It serves for stiffening the arrangement comprising the beams 28, 30 and platform 32.

The three bearings 34, 36, 38 of platform 32 form the corners of a substantially equal-sided triangle. Above this triangle, a quill 42 is arranged on platform 32. Quill 42 can be moved longitudinally in the direction of arrow 44 (FIG. 3), this direction being perpendicular to the plane of the table 12 and thus representing the Z-direction.

At the lower free end of quill 42, a probe holder 46 is arranged for receiving a measuring probe. In the embodiment shown here, the coordinate measuring machine 10 even has two probe holders 46, namely a first probe holder 46a for a tactile touch probe and a second probe holder 46b for an optical measuring system. Quill 42 is mounted on a total of 8 air bearings 48, which bear against three external sides, each flat, of quill 42 (cf. FIG. 5). The carriage of a linear drive 50 is located on the fourth external side, as is explained in more detail below with reference to FIG. 5.

Figure 4:
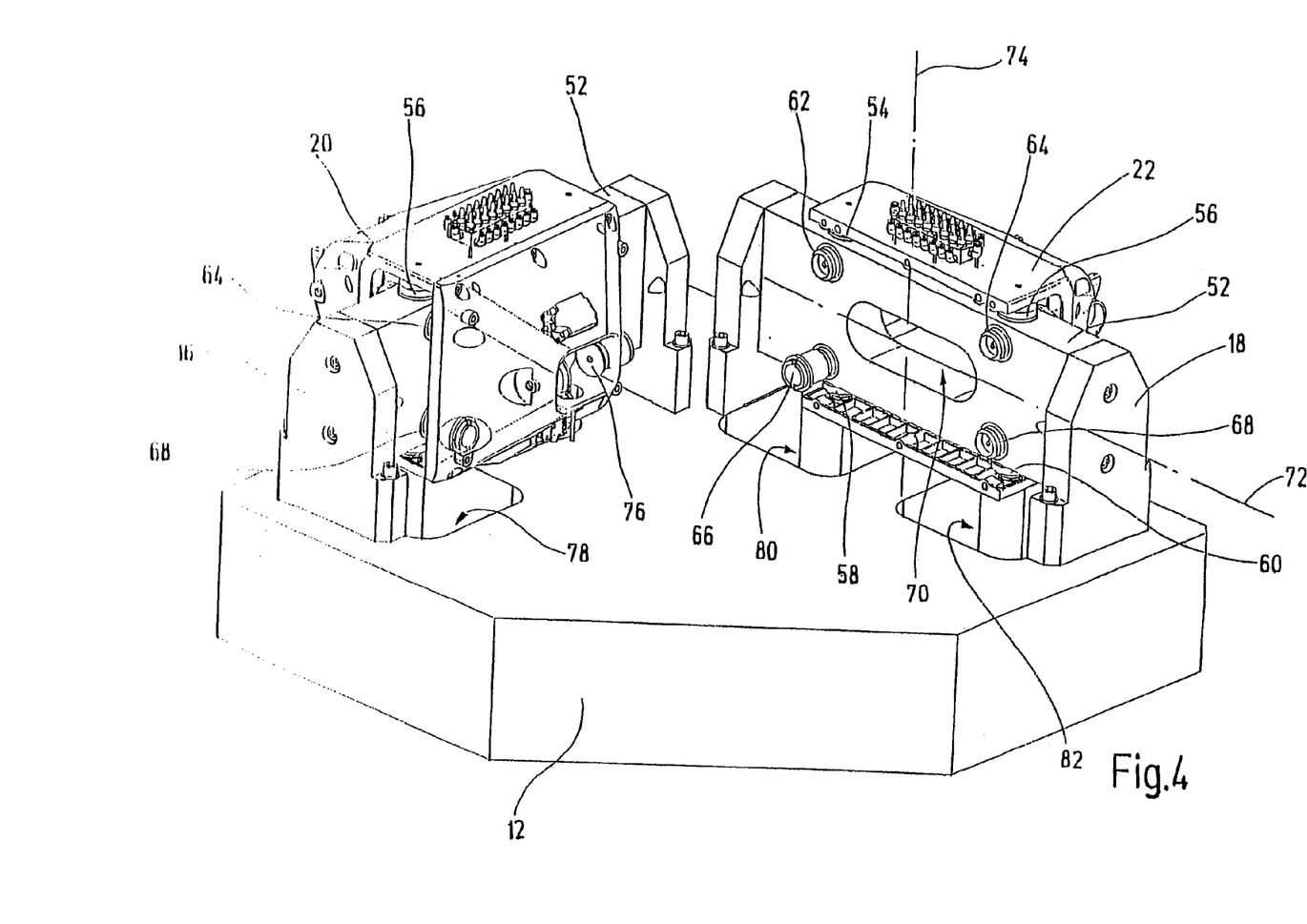
FIG. 4 shows the bearing supports and carriages of the coordinate measuring machine according to FIG. 3 in a partially cut-away view.

As can be seen in the partially cut-away view in FIG. 4, each bearing support 16, 18 has a parallelepiped-shaped portion, along which the respective carriage 20, 22 slides. Each carriage 20, 22 wraps round the parallelepiped-shaped portion like a sleeve and is supported on an upper guide surface 52 in each case via two bearings 54, 56 arranged separately from one another. There are two counter bearings 58, 60 on the parallel bottom-sided guide surface of the parallelepiped-shaped portion, the two counter bearings lying on the same axis below bearings 54, 56.

Moreover, each carriage 20, 22 is supported via four bearings 62, 64, 66, 68 and four counter bearings, in each case on the same axis, on the vertical guide surfaces of the respective parallelepiped-shaped portion. All the bearings mentioned so far are air bearings, and bearing 66 is shown with its respective cable connection in the partially cut-away view of FIG. 4. In the preferred embodiment, bearings 62, 64, 66, 68 of each carriage 20, 22 are designed as solid bearings, whereas the counter bearings, which cannot be seen in FIG. 4, are moveable bearings.

FIG. 4 also shows that the parallelepiped-shaped portions of bearing supports 16, 18 each have a horizontal, slot-shaped opening 70, which can, however, only be seen for bearing support 18 in the view given in FIG. 4. Beams 28, 30 pass through the slot-shaped openings 70, so that opening 70 permits displacement of carriages 20, 22 perpendicularly to the respective beam 28, 30.

The slot-shaped openings 70 define a horizontal plane 72 (or a horizontal space volume with the height of the openings), and bearings 62, 64, 66, 68 are arranged in such a way that they are outside of plane 72 or outside of the space volume. In fact bearings 62, 64 (with their respective counter bearings) are arranged above plane 72, whereas bearings 66, 68 are below plane 72. Bearings 62-68 (and their corresponding counter bearings) thus define a bearing plane 74, which lies perpendicularly to plane 72 and perpendicularly to the plane of the table 12.

Beams 28, 30 are also supported by air bearings in carriages 20, 22, one being designated with reference number 76 in FIG. 4.

Beneath bearing support 16, table 12 has a recess 78, and two further recesses 80, 82 are arranged beneath bearing support 18. C-shaped frames 84 pass through the recesses 78, 80, 82, and wrap around table 12 above and below. The upper free end of each frame 84 is connected to platform 32, namely in the region of bearings 34, 36, 38. The lower free end of each frame 84 carries a counter bearing 86, 88 or 90. Counter bearing 86 is arranged beneath bearing 34 on the same axis, whereas counter bearings 88, 90 are each located on the same axis under the bearings 36, 38. In addition, the lower free ends of frames 84 are joined together by means of three cross ties 92, 94, 96.

The coordinate measuring machine 10 thus has a different bearing concept than the coordinate measuring machine from the thesis mentioned at the beginning, both with respect to the mounting of the carriages 20, 22 and with respect to the mounting of platform 32. As a result the new coordinate measuring machine 10 can be produced more economically but its maximum attainable measurement accuracy is higher.

Figure 5:
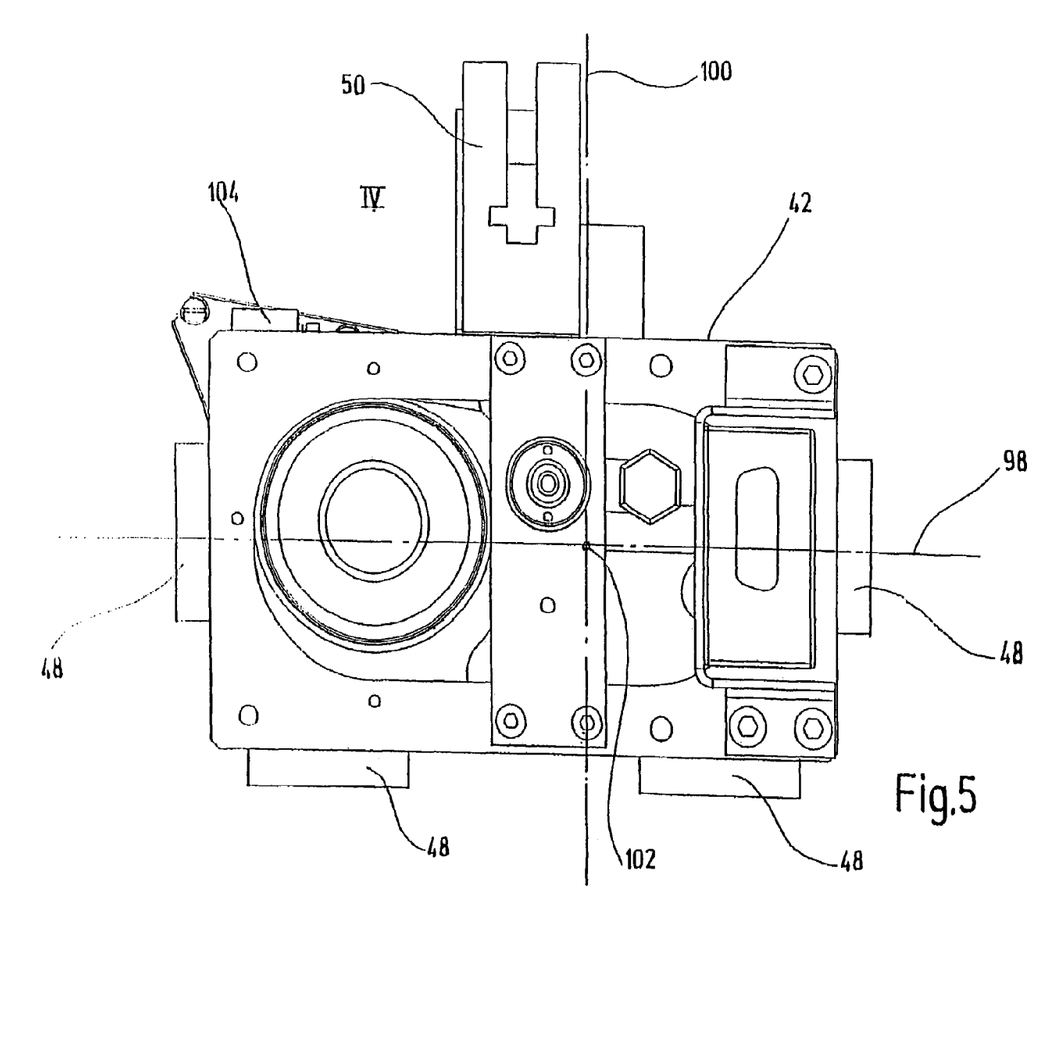
FIG. 5 shows the quill of the coordinate measuring machine from FIG. 1, viewed from above.

A further improvement over the known coordinate measuring machine can be seen from FIG. 5. This shows quill 42, moveable in the Z-direction, as viewed from above. In addition, a coordinate system is shown with two axes 98, 100, with its origin at the center of gravity of quill 42. The coordinate system forms four quadrants, and the arrangement of quill 42 is selected so that the linear drive 50 and the measuring system for determination of the vertical Z-position (designated here by reference number 104) are arranged in the same quadrant IV. As already mentioned above, this allows to achieve a higher measurement accuracy.

What is claimed is:

1. A coordinate measuring machine for the metrological determination of a measurement coordinate on a test object, comprising a table for mounting the test object, the table defining a first plane, a probe holder for receiving a measuring probe, a first bearing support having a first upper guide surface and a first vertical guide surface, on which a first carriage is mounted moveably in a first longitudinal direction, a second bearing support having a second upper guide surface and a second vertical guide surface, on which a second carriage is mounted moveably in a second longitudinal direction, and a first and a second beam, each of which being coupled to the probe holder, wherein the first beam extends parallel to the second bearing support and is arranged on the first carriage such that it can be moved longitudinally in the second direction, wherein the second beam extends parallel to the first bearing support and is arranged on the second carriage such that it can be moved longitudinally in the first direction, and wherein the first and second bearing supports each have a slot-shaped opening through which one of the beams projects, the slot-shaped openings defining a second plane, wherein the first carriage is mounted on the first bearing support via at least three first bearing points, which bear against the first vertical guide surface so as to define a first vertical bearing plane perpendicular to the first plane, wherein the second carriage is mounted on the second bearing support via at least three second bearing points, which bear against the second vertical guide surface so as to define a second vertical bearing plane perpendicular to the first plane, and wherein at least one of said first bearing points and at least one of said second bearing points lie on either side of the second plane.

2. The coordinate measuring machine of claim 1, wherein the measuring probe comprises a touch probe.

3. The coordinate measuring machine of claim 1, wherein the at least three vertical bearing points comprise four separate bearing points in each case.

4. The coordinate measuring machine of claim 1, wherein the first and second bearing points lie outside the second plane.

5. The coordinate measuring machine of claim 1, wherein the first and second carriage each are vertically supported via at least one further bearing point abutting the respective upper guide surface.

6. The coordinate measuring machine of claim 5, comprising at least two separate upper bearing points on each bearing support for vertically supporting each carriage on the upper guide surfaces.

7. The coordinate measuring machine of claim 1, further comprising a platform on which the probe holder is arranged, wherein the platform is connected to the first and second beam and is supported on the table via at least one platform bearing.

8. The coordinate measuring machine of claim 7, comprising three platform bearings for supporting the platform on the table.

9. The coordinate measuring machine of claim 8, further comprising three platform counter bearings which bear against the underside of the table and cooperate with the three platform bearings.

10. The coordinate measuring machine of claim 9, wherein each platform bearing has a respective platform counter bearing arranged beneath, so that each platform bearing and its respective platform counter bearing define an axis extending perpendicular to the table.

11. The coordinate measuring machine of claim 8, further comprising a plurality of cross ties connecting the platform counter bearings to one another.

12. The coordinate measuring machine of claim 8, wherein the table comprises a plurality of recesses in the region of the bearing supports, and comprising a plurality of frames, with each platform bearing being connected to a platform counter bearing via a frame that passes through one of the recesses.

13. The coordinate measuring machine of claim 1, further comprising a quill having a drive for longitudinal displacement in a third direction and having a measuring system for determining a longitudinal position of the quill in the third direction.

14. The coordinate measuring machine of claim 13, further comprising a plurality of quill bearings, which define the position of the quill perpendicularly to the third direction.

15. The coordinate measuring machine of claim 14, wherein the quill bearings define a first and a second axis extending orthogonal to each other, thereby defining an imaginary coordinate system having four quadrants, with the imaginary coordinate system having an origin lying at a center of gravity of the quill, and wherein the drive and the measuring system are arranged in one quadrant of the imaginary coordinate system.

16. A coordinate measuring machine for the metrological determination of a measurement coordinate on a test object, comprising a table for mounting the test object, the table having a topside and an underside, a probe holder for receiving a measuring probe, a platform on which the probe holder is arranged, a first bearing support, on which a first carriage is mounted moveably in a first longitudinal direction, a second bearing support, on which a second carriage is mounted moveably in a second longitudinal direction, and a first and a second beam, each of which being coupled to platform, wherein the first beam extends parallel to the second bearing support and is arranged on the first carriage such that it can be moved longitudinally in the second direction, wherein the second beam extends parallel to the first bearing support and is arranged on the second carriage such that it can be moved longitudinally in the first direction, wherein the platform is supported on the table via at least three platform bearings which bear against the topside and via at least three platform counter bearings which bear against the underside and cooperate with the platform bearings on the topside.

17. The coordinate measuring machine of claim 16, further comprising a plurality of cross ties connecting the platform counter bearings to one another.

18. The coordinate measuring machine of claim 16, wherein the table comprises a plurality of recesses in the region of the bearing supports, and comprising a plurality of frames, with each platform bearing being connected to aplatform counter bearing via a frame that passes through one of the recesses.

19. The coordinate measuring machine of claim 16, wherein each platform bearing has a respective platform counter bearing arranged right beneath, so that each platform bearing and its respective platform counter bearing define an axis extending perpendicular to the table.

* * * * *